April 5, 1966  B. WALKER  3,244,896
STAR TRACKER SCANNING SYSTEM USING A CIRCULAR
SCANNING PATTERN AND A SQUARE APERTURE
Filed Dec. 14, 1962
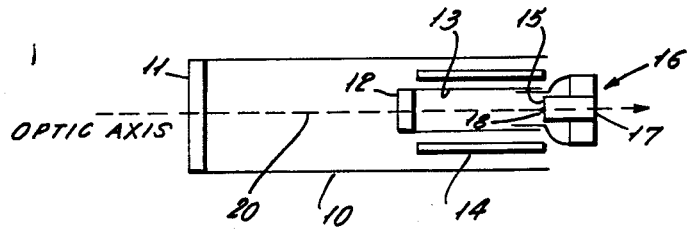
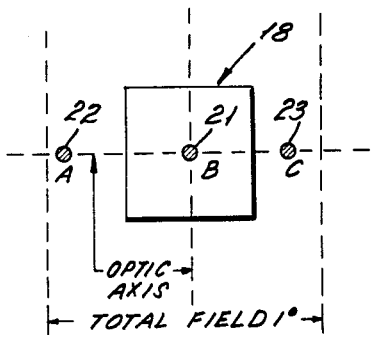
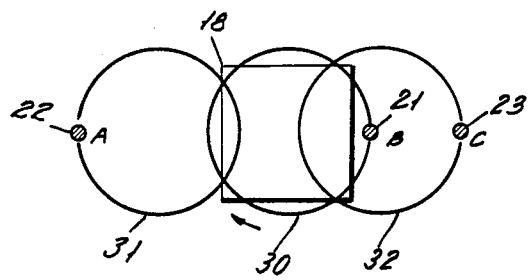
INVENTOR.
BURT WALKER
BY
OSTROLENK, FABER, GERB & SOFFEN
ATTORNEYS

United States Patent Office 3,244,896
Patented Apr. 5, 1966

3,244,896
STAR TRACKER SCANNING SYSTEM USING A CIRCULAR SCANNING PATTERN AND A SQUARE APERTURE
Burt Walker, Plainview, N.Y., assignor to Kollsman Instrument Corporation, Elmhurst, N.Y., a corporation of New York
Filed Dec. 14, 1962, Ser. No. 244,665
2 Claims. (Cl. 250—236)

This invention relates to a novel scanning system for use with a radiation sensing device, and more specifically relates to a scanning mechanism for star trackers in which the star image is oscillated with respect to a scanning aperture.

Star trackers and scanning systems therefore are well known in the art. In a typical system, radiation is modulated by the scanning aperture with the light passing through the aperture falling upon a photosensitive device which delivers appropriate signals to indicate deviation of the object from the optical image of the aiming telescope.

The principle of this invention is to provide a novel non-mechanical type of scanning system wherein the image of a source of radiation which is to be tracked is applied to a photocathode of an image dissector photomultiplier-type device.

The electrons emitted by the photocathode are then controlled by appropriate deflection and focusing means to describe a circle about a square aperture which shields an enlarged surface cathode of a photomultiplier system. So long as the optical axis of the telescope is pointed directly at the object being tracked, the electrical image of the object will intercept each corner of the square aperture shielding the photomultiplier. Therefore, four discrete pulses will be generated for a complete circular excursion of the image with respect to the square aperture. That is, each time the image passes through a corner of the aperture, the photomultiplier will generate an output signal. If now, the object being tracked moves off the optical axis of the telescope, the electrical image which is swept with respect to the square aperture will move through the aperture only a single time in a single cycle of the image. Therefore, only a single signal for one excursion will be generated.

The phase of this output signal will depend upon the side of the aperture through which the off-center image passes so that sense information required for correction can be obtained from the photomultiplier output.

Accordingly, a primary object of this invention is to provide a novel scanning system for radiation tracking devices which has no moving parts.

Another object of this invention is to provide a novel method of image dissector star scanning.

A further object of this invention is to imitate the operation of the so-called rotating wedge-type tracking system by means of a non-mechanical system.

Another object of this invention is to provide a novel star tracking system having no moving parts which has a very wide field of view.

These and other objects of this invention will become apparent from the following description when taken in connection with the drawings, in which:

FIGURE 1 schematically illustrates a side view of a telescope which incorporates the novel tracking mechanism of the invention.

FIGURE 2 illustrates a plan view of the scanning aperture of FIGURE 1 with the relative positions of the image being tracked with no deflection for three relative relationships between the optical axis of the telescope and the position of the image.

FIGURE 3 schematically illustrates the manner in which each of the patterns of FIGURE 2 are caused to oscillate with respect to the scanning aperture.

Referring first to FIGURE 1, I have illustrated therein a telescope which is formed in any desired manner of a housing 10 with an objective lens system 11. The objective lens system 11 gathers the radiation as from a distant star which is to be tracked, and focuses this radiation on a photocathode 12 which can be prepared in accordance with presently well understood techniques.

The photocathode 12 can be contained in an evacuated housing 13 which is surrounded by appropriate deflection and focusing coils 14 which, again, are well known to those skilled in the art, and can be readily manufactured. The deflection and focusing coils 14 serve to focus electrons emitted from photocathode 12 toward the front plate 15 of the image dissector tube generally shown at 16 which includes a photomultiplier output system 17. Such tubes are available at the present time as tube types FW118, FW129, which are manufactured by the ITT Federal Laboratories Company.

The front plate 15 has an aperture 18 therein which is square in configuration, and is shown in enlarged view in FIGURES 2 and 3.

When the optical axis 20 of telescope 10 is on line with the image being tracked, the electron beam emitted by photocathode 12 will be directly aligned with the center of aperture 18, as schematically illustrated by the shaded image 21. Note that the center of aperture 18 is directly aligned with the optical axis 20 of the telescope and in a plane which is perpendicular to the optical axis 20.

As an example of the operation of the above noted system, two typical situations which can occur where the image being tracked moves to the left of the optical axis, as indicated by image 22, or to the right of the optical axis, as indicated by image 23. Note that the positions of images 21, 22 and 23 are shown for no excitation on the deflection coils.

In a particular embodiment of the invention, aperture 18 can have a dimension which is 0.25 by 0.25 inch, while the image such as image 21 with respect to aperture 18 will have a cross-sectional area of $6 \times 10^{-4}$ square inches.

In accordance with the invention, the deflection coils 14 are such that the electron beam emitted from photocathode 12 is caused to oscillate as by swinging in a circle. Thus, as shown in FIGURE 3, if the telescope location is such that image 21 is centrally located in aperture 18, the deflection coils 14 will swing image 21 around a circle 30 which has a diameter less than the diagonal length of aperture 18. Conversely, where the image is at location 22, the image will define a motion around circle 31. Finally, where the image is to the right of aperture 18, as indicated by image 23, it will move according to circle 32.

The total field of view, as indicated in FIGURE 2, may be of the order of 1°, since any star or similar source of radiation within this 1° range will be sensed by the image dissector tube 16. Thus, an extremely wide field of view is available.

By now applying an appropriate sinusoidal deflection signal to coils 14, and assuming that the image is centered as is image 21, the image will intersect each corner of rectangular aperture 18 to thereby deliver an output pulse from the multiplier output 17 four times for a single excursion of image 21. A frequency of 350 cycles per second for oscillation of image 21 has been found satisfactory.

If now, the image drifts to the left of the optical axis 20, as indicated by image 22 in FIGURES 2 and 3, the output signal of the photomultiplier 17 changes from the quadruple frequency to a frequency which is equal to the frequency of rotation of image 22, since the image 22 intersects the aperture 18 only a single time during each excursion. Therefore, this signal can be utilized as an error signal to cause a correction in alignment, for example, of a vehicle which carries the system.

If, on the other hand, the image drifts to the right of aperture 18, as indicated by image 23, it will also now intersect aperture 18 only once during a single excursion, as shown in FIGURE 3, by circle 32, but the output signal will have a phase which is 180° displaced from the phase of the signal generated by an image 22 which is to the left of aperture 18. Therefore, the single frequency output from photomultiplier 17 is utilized to indicate misalignment between the image and the optical axis, while the phase of this output signal will indicate the direction of the error.

Clearly, the above noted system can be used for scanning in two perpendicular axes. That is, the star image is off the optical axis in any direction, the output contains a greatly reduced fourth harmonic component and a fundamental component which increases with increasing lateral displacement of the image. This fundamental is the tracking error signal; its magnitude is a function of the magnitude of the error and its phase is a measure of the direction of error about the roll axis. This error signal can be resolved into cosine and sine components to be used as inputs to pitch and yaw (two-axis) control motors.

Although this invention has been described with respect to its preferred embodiments, it should be understood that many variations and modifications will now be obvious to those skilled in the art, and it is preferred therefore that the scope of this invention be limited not by the specific disclosure herein, but only by the appended claims.

What is claimed is:

1. A scanning system comprising an objective for gathering light from a light source to be tracked, photocathode means in the focal plane of said objective for generating a beam of electrons at areas at which light strikes said photocathode, an electron beam control means for focusing and controllably deflecting said beam of electrons, an electron-sensitive device for generating an output signal responsive to impingement thereon of said electron beam, and a masking aperture interposed between said electron-sensitive device and said photocathode; said deflecting means being energized to cause said electron beam to rotate in a predetermined cyclic pattern; said electron beam passing through the center of said masking aperture when the optical axis of said objective is pointed directly toward said light source to be tracked in the absence of energization of said deflecting means; said masking aperture being square; said predetermined pattern of electron beam movement being a circle; the diameter of said circle being less than the diagonal length of said square masking aperture.

2. A scanning system comprising an objective for gathering light from a light source to be tracked, photocathode means in the focal plane of said objective for generating a beam of electrons at areas at which light strikes said photocathode, an electron beam control means for focusing and controllably deflecting said beam of electrons, an electron-sensitive device for generating an output signal responsive to impingement thereon of said electron beam, and a masking aperture interposed between said electron-sensitive device and said photocathode; said deflecting means being energized to cause said electron beam to rotate in a predetermined cyclic pattern; said electron beam passing through the center of said masking aperture when the optical axis of said objective is pointed directly toward said light source to be tracked in the absence of energization of said deflecting means; said masking aperture being square; said predetermined pattern of electron beam movement being a circle; the diameter of said circle being less than the diagonal length of said square masking aperture; said scanning system having a field of view of the order of 1°.

References Cited by the Examiner

UNITED STATES PATENTS

| | | | |
|---|---|---|---|
| 2,425,956 | 8/1947 | Salinger | 88—1 |
| 2,892,949 | 6/1959 | Hardy | 250—203 X |
| 2,965,762 | 12/1960 | Turck | 250—203 |
| 2,967,247 | 1/1961 | Turck | 250—203 |
| 3,098,933 | 7/1963 | Barasch | 88—1 |
| 3,149,235 | 7/1964 | Clark | 250—203 |

RALPH G. NILSON, *Primary Examiner.*

WALTER STOLWEIN, *Examiner.*

J. D. WALL, *Assistant Examiner.*